(12) United States Patent
Sinha et al.

(10) Patent No.: US 12,012,427 B2
(45) Date of Patent: Jun. 18, 2024

(54) SYNTHESIS OF FMOC-PROTECTED MORPHOLINO MONOMERS AND THEIR USE IN THE SYNTHESIS OF MORPHOLINO OLIGOMER

(71) Applicant: INDIAN ASSOCIATION FOR THE CULTIVATION OF SCIENCE, Kolkata (IN)

(72) Inventors: Surajit Sinha, Kolkata (IN); Jayanta Kundu, Kolkata (IN); Ujjwal Ghosh, Kolkata (IN)

(73) Assignee: INDIAN ASSOCIATION FOR THE CULTIVATION OF SCIENCE, West Bengal (IN)

( * ) Notice: Subject to any disclaimer, the term of this patent is extended or adjusted under 35 U.S.C. 154(b) by 902 days.

(21) Appl. No.: 17/085,201

(22) Filed: Oct. 30, 2020

(65) Prior Publication Data

US 2021/0130379 A1   May 6, 2021

(30) Foreign Application Priority Data

Oct. 31, 2019   (IN) .............................. 201931044056

(51) Int. Cl.
| | | |
|---|---|---|
| *C08G 73/06* | (2006.01) |
| *C07F 9/6533* | (2006.01) |
| *C07F 9/6558* | (2006.01) |
| *C07F 9/6561* | (2006.01) |

(52) U.S. Cl.
CPC ........ *C07F 9/65616* (2013.01); *C07F 9/6533* (2013.01); *C07F 9/65583* (2013.01); *C08G 73/06* (2013.01)

(58) Field of Classification Search
USPC .......................................... 528/394
See application file for complete search history.

(56) References Cited

FOREIGN PATENT DOCUMENTS

KR   20190017805 A * 2/2019

OTHER PUBLICATIONS

KR20190017805A Machine Translation (Year: 2019).*

* cited by examiner

*Primary Examiner* — Terressa Boykin
(74) *Attorney, Agent, or Firm* — PEARL COHEN ZEDEK LATZER BARATZ LLP (57) ABSTRACT

Present invention relates to stable Fmoc protected Morpholino monomers and corresponding oligonucleotides (PMO) and efficient synthesis of the same involving chlorophosphoramidate and H-Phosphonate chemistry. Successful syntheses of the oligonucleotide with higher yield and lesser time have been accomplished employing solid phase synthesis and easy deprotection of Fmoc group with Piperidine.

13 Claims, 5 Drawing Sheets

| Experiment No | Active monomer 2c(eq) | NH monomer $a_1$(eq) | Activator(eq) | N ethyl morpholino (eq) | Solvent |
|---|---|---|---|---|---|
| 1 | 1 | 1 | no | 5 | DMF |
| 2 | 1 | 1 | 2 eq ETT | 5 | DMF |
| 3 | 1 | 1 | 2 eq LiBr | 5 | DMF |

Lane 4 in TLC is Authentic Dimer

HRMS (ESI) m/z (M+H)$^+$ calculated for $C_{60}H_{66}N_{10}O_{10}PSi^+$ = 1145.4470 found 114!

SYNTHESIS OF FMOC-PROTECTED MORPHOLINO MONOMERS AND THEIR USE IN THE SYNTHESIS OF MORPHOLINO OLIGOMER

CROSS REFERENCE TO RELATED APPLICATION

This application claims priority from Indian Patent Application No. 201931044056, filed Oct. 31, 2019, which is incorporated herein by reference in its entirety.

FIELD OF THE INVENTION

The present invention relates to morpholino monomers comprising Fmoc (Fluorenylmethoxycarbonyl)-protected chlorophosphoramidate monomers and H-phosphonate monomers that are capable of further chain elongation favoring morpholino oligonucleotides preferably via peptide synthesizer and/or solid phase synthesis. The process chemistry for efficient synthesis of said Fmoc-protected morpholino monomers comprising Fmoc (Fluorenylmethoxycarbonyl)-protected chlorophosphoramidate monomers and H-phosphonate monomers are provided together with phosphorodiamidate morpholino oligonucleotides (PMO) finding end use and application in antisense technology.

BACKGROUND OF THE INVENTION

RNA based therapies hold the promise to expand the range of druggable targets from proteins to RNAs and the genome, as evidenced by several RNA drugs approved for clinical practice and many others under active trials. While chemo-engineered RNA mimics have found their success in marketed drugs and continue dominating basic research and drug development, these molecules are usually conjugated with extensive and various modifications.

Phosphorodiamidate morpholino oligomers (PMO) are short single-stranded DNA analogues that are built upon a backbone of morpholine rings connected by phosphorodiamidate linkages. As uncharged nucleic acid analogues, PMO bind to complementary sequences of target mRNA to block protein translation through steric blockage. PMO interference of viral protein translation operates independently of RNase H. (Yuchen Nan and Yan-Jin Zhang Frontiers in Microbiology www.frontiersin.org 2 Apr. 2018|Volume 9|Article 750)

PMOs are routinely used for selective gene regulation due to its target specificity and very good pharmacokinetics owing to its enough endonuclease stability. In 2016, Eteplirsen, the only PMO based drug is approved by FDA after clinical phase trials for the treatment of Duchenne muscular dystrophy, developed by Sarepta Therapeutics, USA.

At present, there is only one company Gene Tools LLC, USA (www.gene-tools.com) is supplying PMOs and it is their patented technology (a. Summerton, J.; Weller, D. U.S. Pat. No. 5,185,444, 1993; b. Weller, D. D.; Hassinger J. N. U.S. Patent 2009/0088562A1). Morpholino oligomers containing both uncharged and cationic inter-subunit linkages are provided. The oligomers are oligonucleotide analogs containing predetermined sequences of base-pairing moieties. The presence of the cationic inter-subunit linkages in the oligomers, typically at a level of about 10-50% of total linkages, provides enhanced antisense activity with improved cell permeability, in various antisense applications, relative to the corresponding uncharged oligomers (Sinha et. al. Morpholino based antisense agent. U.S. Pat. No. 9,914,745B2). Also provided are such oligomers conjugated to peptide transporter moieties, where the transporters are preferably composed of arginine subunits, or arginine dimers, alternating with neutral amino acid subunits or internal guanidinium transporter (Sinha et. al. Bioconjugate Chem. 2016, 27, 2254-2259).

Present technology for making PMOs is patented by Gene Tools LLC using chlorophosphoramidate chemistry. It involves the use of trityl-protected activated monomers called chlorophosphoramidate morpholino monomers and coupled with another monomer at the "N" terminal on solid support. In this process, the deblocking of trityl protection is done initially using acetic acid in trifluoroethanol, however, this reagent combination takes so much time to complete the Trityl-deprotection, hence is not efficient to complete the synthesis in time (a. Summerton, J.; Weller, D. U.S. Pat. No. 5,185,444, 1993).

Next, another method was developed (Reeves, M. D.; Weller, D. D. U.S. Patent 2009/0131624A1) to use heterocyclic amine-based acidic salt in a trifluoroethanol containing solvent. Amine salts having a pKa in the range of 1-4 in its protonated form with an acid selected from sulfonic acid, trifluoroacetic acid and hydrochloric acid and the free "N" of morpholino ring generated is used for next coupling with the activated monomers on solid support. This process is continued until the desired length of oligomer is synthesized.

Limitations of the above approach being that Trityl protected activated chlorophosphoramidates monomers are not very stable, particularly in presence of organic or inorganic bases in organic solvents and decomposed within 1 hr and long time storage in solid form gives decomposition unless it is stored perfectly under argon atmosphere. For coupling reaction, LiBr is used as a coupling assisting reagents and takes 2 hr per coupling. Therefore, it becomes a problem for a longer oligomer synthesis particularly 25-mer, typically used for biological applications because keeping activated monomers in solution led to the decomposition which is ultimately wastage of monomers. To complete the 25-mer synthesis, 2×25=50 hrs is required only for coupling. Hence, solution of activated monomers is prepared freshly in every coupling. If the synthesis is done in DNA synthesizer then all the monomers solutions are connected in the synthesizer at the beginning of the synthesis and it is required to keep until the synthesis is completed in the synthesizer. There is no scope for the preparation of solution in every time. This therefore demands the development of highly efficient stable monomers and coupling methods thereto which can be finished in very less time in which activated yet stable monomers will remain intact in solution.

Another limitation is—the trityl deblocking needs strong acid and takes more time in the synthesis of oligomers. Deblocking system is complex mixture of heterocyclic base (3-chloropyridine or 3-cyanopyridine) and strong acids like sulfonic, or trifluoroacetic acid or hydrochloric acid. Therefore, it is necessary to develop a protocol for Fmoc-protected activated monomer synthesis where Fmoc can be easily deprotected by 20% piperidine in DMF or polar solvents and should be stable in solution. At present Gene Tools LLC is the only commercial source of morpholino. To the best of prior knowledge, the exact synthesis procedure of PMOs using Trityl-protected chlorophosphoramidate chemistry is only mentioned. Hence, an alternative, efficient synthetic protocol is necessary for the synthesis of PMO.

OBJECTS OF THE INVENTION

The prime object of the present invention is to provide for Fmoc-protected activated chlorophosphoramidate monomers and H-phosphonate monomers and their synthesis thereof enabling morpholino oligonucletide synthesis and oligonucleotides thereof which monomers are stable in common organic solvents like DMF, NMP acetonitrile, THF and DCM.

Another object of the invention is to use suitably protected chlorophosphoramidate morpholino monomers and/or H-phosphonate monomers which could be successfully used for Peptide synthesizer and also utilized for chain elongation in solid phase synthesis.

Yet another object of the present invention is to be able to involve more concentrated chlorophosphoramidate morpholino monomers for the synthesis of oligonucleotides.

Another object of the present invention is to develop more efficient coupling for the reactants with respect to conventional reagent like LiBr for coupling.

Another object of the invention is to employ Fmoc as the protecting group for the Morpholino monomers instead of Tr or MMTr-protected monomers that requires deblocking system of complex mixture of heterocyclic base (3-chloropyridine or 3-cyanopyridine) and strong acids like sulfonic or trifluoroacetic acid or hydrochloric acid, and so that that the same can be avoided by way of the present invention.

SUMMARY OF THE INVENTION

Thus, the basic aspect of the present invention is directed to provide Morpholino monomers comprising Fmoc (Fluorenylmethoxycarbonyl)-protected chlorophosphoramidate monomers and H-phosphonate monomers as per the general formula 2 and 3 represented hereunder.

Another aspect of the present invention is directed to provide Morpholino monomers that are capable of activation for further coupling and chain elongation favouring Morpholino based oligonucleotides (PMO).

Yet another aspect of the present invention is directed to provide Morpholino monomers that are stable in solution preferably in common organic solvents including DMF, NMP, acetonitrile, THF and DCM normally used for oligomer synthesis, involves easy deprotection, and is capable of further chain elongation favouring oligonucleotides preferably via DNA or peptide synthesizer and/or solid phase synthesis.

Still another aspect of the present invention is directed to provide Morpholino monomers wherein said general formula 2 includes monomers (2a)-(2d) depending on nucleotide base substitutions in the morpholino ring as per the following monomers:

Wherein for said a, b, c, d monomers; base B=Thymine, Cytosine (Bz), Adenine (Bz), Guanine (i-Bu)

Further aspect of the present invention is directed to provide Morpholino monomers wherein said general formula 3 includes monomers (3a)-(3d) depending on nucleotide base substitutions in the morpholino ring as per the following monomers:

Wherein for said a, b, c, d monomers; base B=Thymine, Cytosine (Bz), Adenine (Bz), Guanine (i-Bu).

Still further aspect of the present invention is directed to provide Morpholino monomers adapted for morpholino oligomers comprising Fmoc (Fluorenylmethoxycarbonyl)-protected chlorophosphoramidate monomers and/or H-phosphonate monomers.

Another important aspect of the present invention is directed to provide A process for the synthesis of morpholino monomers of general formula (2) comprising the steps of involving activator ETT [5-(Ethylthio)-1H-tetrazole)] to activate the phosphorous reagent (POCl$_2$NMe$_2$) in presence of milder base of pKa ~8 to facilitate the reaction with Fmoc protected morpholine —CH$_2$OH.

Yet another aspect of the present invention is directed to provide a process for the synthesis of morpholino monomers of general formula (2) following the steps of
  (i) Providing Fmoc protected morpholine-OH taken in dry DCM to which ETT (2 eq) and N-Ethylmorpholine (NEM) (5 eq) are added at 0° C.;
  (ii) adding NMe$_2$POCl$_2$ (2 eq) and N-methylimidazole (NMI) (2 eq) followed by stirring in room temperature for about 15 to 20 minutes to obtain product Fmoc protected chlorophosphoramidate morpholino monomers as a white solid.

Still another aspect of the present invention is directed to provide a process for the synthesis of morpholino monomers of general formula (3) comprising the steps:
  (i) providing a stirred solution of PCl$_3$ (5 mmol) and N-ethyl morpholine (10 mmol) in dry DCM followed by addition of 1,2,4-triazole (17 mmol) and stirring at room temperature for 30 min.;
  (ii) adding DCM solution of Fmoc protected morpholine —CH$_2$OH (1.0 mmol, dried by co-evaporation from CH$_3$CN) dropwise at 0° C. and stirring until complete consumption of starting material;
  (iii) quenching in corresponding buffer (Triethylammonium bicarbonate) solution to obtain triethylammonium salt and stirring for 5 min followed by extracting the aqueous layer in DCM and obtaining corresponding Fmoc protected H-Phosphonate morpholino monomer.

Further aspect of the present invention is directed to provide a process for the synthesis of morpholino monomers providing morpholino oligomers following the steps of:
  (i) loading Fmoc protected morpholino monomer into solid support preferably amino polystyrene resins;
  (ii) deprotecting the Fmoc group of thus loaded monomer involving (a) 20% piperidine-DMF to generate free amine on said solid support;
  (iii) reacting/coupling said free amine of said step (ii) involving (b) Fmoc protected chlorophosphoramidate morpholino monomer in presence of said ETT [5-(Ethylthio)-1H-tetrazole)], NEM [N-Ethylmorpholine] in NMP [N-methyl-2-pyrrolidone] to obtain dimer, preferably added 3 times portionwise in 20 minutes interval followed by washing away excess reagents;
  (iv) capping unreacted amine of solid support from step (iii) not undergoing coupling, by involving (c) (1:1) 10% Ac$_2$O-NMP and 10% DIPEA (diisopropylethylamine)-NMP, followed by washing away of capping reagents followed by deblocking/deprotecting as per step (i) prior to next coupling;
  (v) repeating deblocking (ii), coupling (iii) and capping cycle until desired oligomer preferably 25-mer preferably 5'-GACTTGAGGCAGACATATTTCCGAT-3'; and
  (vi) cleaving said oligomer from solid support involving (d) 30% aqueous ammonia at 55° C. for 16 h and obtaining oligomers therefrom.

Another aspect of the present invention is directed to provide a process for the synthesis of morpholino monomers providing morpholino oligomers following steps of:
  (i) loading Fmoc protected morpholino monomer onto solid support preferably amino polystyrene resins;
  (ii) deprotecting the Fmoc group of thus loaded monomer involving (a) 20% piperidine-DMF to generate free amine on said solid support;
  (iii) reacting/coupling said free amine of said step (ii) involving (b) Fmoc protected H-phosphonate morpholino monomer in presence of pivaloyl chloride and p-nitrophenol in a mixture of 1:1 Pyridine-ACN to obtain dimer, preferably added 3 times—portionwise in 10 minutes interval followed by washing away excess reagents;
  (iv) capping unreacted amine of solid support from step (iii) not undergoing coupling, by involving (c) (1:1) 10% Ac$_2$O-ACN and 10% Py-ACN followed by washing away of capping reagents followed by deblocking/deprotecting as per step (i) prior to next coupling;
  (v) repeating deblocking (ii), coupling (iii) and capping cycle until desired oligomer preferably 10-mer 5'-TTC-CAACCGG-3' is reached;
  (vi) oxidizing said oligomer involving (d) 2M Me$_2$NH and 0.1 M 12 solution in THF to introduce NMe$_2$ group to phosphorous in the oligomer backbone; and (vii) Cleaving said oligomer from solid support involving (e) 30% aqueous ammonia at 55° C. for 16 h and obtaining said oligomers therefrom.

Still further aspect of the present invention is directed to provide a process for the synthesis of morpholino monomers and oligomers thereof wherein monomer concentration could be increased to upto 0.15 M from 0.05 to 0.15 M for oligomer synthesis, as compared to Tr or MMTr-protected monomers that can go upto only <0.05M concentration, and wherein coupling efficiency in presence of ETT (5-(ethylthio)-1H-tetrazole) is improved as compared to LiBr, and wherein Fmoc-protected monomers, PMO oligomers could be synthesized via DNA or peptide synthesizer.

Another aspect of the present invention is directed to provide a process for the synthesis of morpholino monomers and oligomers thereof wherein the coupling and deblocking conditions keep the oligomer intact without decomposition generating high yields in the range of 50% to 67%.

DETAILED DESCRIPTION OF THE INVENTION

As discussed herein before, the present invention provides for morpholino monomers comprising Fmoc (Fluorenylmethoxycarbonyl)-protected chlorophosphoramidate monomers and H-phosphonate monomers, capable of further chain elongation favoring morpholino oligonucleotides preferably via Peptide synthesizer and/or solid phase synthesis. The process chemistry for efficient synthesis of said Fmoc-protected morpholino monomers comprising Fmoc (Fluorenylmethoxycarbonyl)-protected chlorophosphoramidate monomers and H-phosphonate monomers are provided together with phosphorodiamidate morpholino oligonucleotides (PMO) finding end use and application in antisense technology.

Said monomers are represented by general formula 2 and 3 represented hereunder:

2

3

Said general formula 2 includes monomers (2a)-(2d) depending on base substitutions in the morpholino ring as per the following monomers:

2a

2b

2c

-continued

2d

Said general formula 3 includes monomers (3a)-(3d) depending on base substitutions in the morpholino ring as per the following monomers:

While the developed methods for the synthesis of PMO using (i) chlorophosphoramidate chemistry and (ii) H-Phosphonate chemistry (Sinha, S. et. al. "*Synthesis of Mor-pholino Monomers, Chlorophosphoramidate Monomers and Solid Phase Synthesis of Short Morpholino Oligomers*". Current Protocols in Nucl. Acid Chem. 2015, 4.65.1-4.65.26 (Wiley); and Sinha, S. et. al. "*Synthesis of phosphorodiamidate morpholino oligonucleotides by H-phosphonate method*". Tetrahedron Lett. 2015, 56, 4565-4568 and Sinha, S. et. al. MMTr-protected H-phosphonate monomers and MMTr-deprotection by organic acids are the right combination of morpholino oligonucleotides synthesis (Patent Application No. as 201631037420, 2 Nov. 2016), are reported and recently, Marvin Caruthers et. al. have published a paper on PMO synthesis using phosphoramidite chemistry (https://doi.org/10.1002/1873-3468.13492), again dimethoxytrityl (DMTr) group was used as OH protection. Acid-mediated cleavage of DMTr group was performed for chain elongation, but no method for the synthesis of PMO using Fmoc chemistry is known till date.

Another important embodiment is that all prior known syntheses have been achieved using either trityl (Tr) or monomethoxytrityl (MMTr) or DMTr-protected morpholino monomers. While chain elongation in solid phase synthesis, Tr or MMTr or DMTr was deprotected by acid treatment or amine salt which is acidic in nature. Though the phosphorodiamidate backbone is stable under the acid deprotection conditions however, it is not advisable to keep the morpholino oligomer (PMO) in acidic conditions for a long time because degradation occurs. Moreover, the activated chlorophosphoramidate monomers are not stable in solution. Coupling step takes long reaction time using LiBr. Larger equivalent of LiBr forms a precipitate in solution which creates problem, particularly not useful in peptide synthesizer which may block the pipeline.

Though PMOs are oligonucleotides and unlike DNA, PMO is neutral molecule like peptide, hence Fmoc chemistry/protecting group—routinely used in solid phase peptide synthesis was considered for preparation of said monomers and oligomers thereof. Fmoc group is normally deprotected by 20% piperidine in DMF. Hence, chemistry is completely different than others so far have been reported. After screening several reagents such as tetrazole, 4,5-dicyanoimidazole (DCI), ETT [5-(Ethylthio)-1H-tetrazole)] and iodine, ETT and iodine were found to improve the coupling efficiency instead of LiBr, during chain elongation leading to facile synthesis of oligomers.

While the first challenge was the preparation of Fmoc-protected activated stable morpholino monomers then second challenge was the chain elongation in solid phase synthesis. Here, the detailed synthesis of morpholino oligonucleotides (PMO) either using Fmoc-protected activated chlorophosphoramidate monomers or H-phosphonate monomers in the presence of ETT are presented under non-limiting examples.

In an attempt to develop a methodology for efficient synthesis of PMO utilizing fast coupling step, the present group disclosed H-Phosphonate chemistry in PMO synthesis using Tr or MMTr-protected H-Phosphonate monomers. As mentioned herein before the activated chlorophosphoramidate monomers are not stable in solution and an unsuitable candidate for DNA synthesizer (Trityl chemistry is used in DNA synthesizer because trityl monitoring system is involved in the machine)—a new chemistry is developed to synthesize morpholino monomers employing Fmoc protecting group. Fmoc chemistry is usually used in peptide synthesizer (because Fmoc monitoring system is involved) which is deblocked easily by 20% piperidine in DMF. Such chemistry could be amenable to a peptide synthesizer even in DNA synthesizer. In the case of DNA synthesizer only trityl monitoring system will be inactive otherwise all other functions would be compatible. In trityl deblocking reagent bottle, 20% piperidine in DMF or NMP would be used. While deblocking the Fmoc group, synthesizer will deliver the 20% piperidine in DMF or NMP to the solid support synthesis column. In the present invention for the first time Fmoc protected chlorophosphoramidate monomers or Fmoc protected H-Phosphonate monomers have been explored and successfully incorporated in the synthesis of PMO either by chlorophosphoramidate chemistry or H-Phosphonate chemistry.

It is to be understood that both the foregoing general description and the following detailed description are exemplary and are intended to provide further explanation of the invention as claimed. The advancement according to the present invention is discussed in further detail in relation to the following non-limiting exemplary illustrations wherein:

Example 1

Synthesis of Fmoc Protected Morpholino Monomer

Chlorophosphoramidate Chemistry:

Morpholino Chloro phosphoramidate monomer

Oligomer $R' = H,$
Other modifications $B = T, C(Bz), A(Bz), G(i\text{-}Bu)$

$R =$ Trityl (Tr), Monomethoxytrityl (MMTr)

Flurenylmethoxycarbonyl(Fmoc)
This report, R = Fmoc
When R = Tr reported by www.gene-tools.com
When R = Tr or MMTr reported by us
Current Protocols in *Nucl. Acid Chem.* 2015, 4.65.1-4.65.26

H-Phosphonate Chemistry:

$X = Et_3N$ or DBU or any tertiary amine
Morpholino H-Phosphonate monomer

Oligomer

R' = H,
Other modifications

This report, R = Fmoc
When R = Tr or MMTr reported by us
Patent Application No. as 201631037420, 2nd November, 2016

Procedure for the Synthesis of Fmoc Protected Morpholino-OH (1):

N-Fmoc and O-silyl protected monomers were treated with trifluoroacetic acid (TFA):Water (7:3) and stirred at room temperature. Reaction was monitored by TLC. TLC showed complete consumption of the starting materials and then the reaction mixture was dissolved in DCM and washed with water. The organic part was dried over $Na_2SO_4$ and concentrated under reduced pressure. Then the crude product was purified by column chromatography in 100-200 mesh silica gel eluting with 5% MeOH-DCM to get the desired Fmoc-protected monomers 1a, 1b, 1c and 1d as white solid.

Example 2

Comparative-Synthesis of Fmoc-Protected Activated Monomers:

Synthesis of Fmoc-protected chlorophosphoramidate morpholino monomers were performed according to scheme 2. Initial attempt to synthesize Fmoc-protected activated monomers using earlier reported procedure by the present inventor (Sinha et. al. Tetrahedron Lett. 2012, 53, 6714-6717) was failed to provide the desired product because of strong basicity of the reagent like DBU (1,8-Diazabicyclo[5.4.0]undec-7-ene). In presence of DBU, Fmoc-group was not stable because pKa of DBU is 13.5. Any base whose pKa is >10 is not recommended for using on Fmoc protected compounds because all these bases could cleave Fmoc group. At the same time, to activate or deprotonate the "H" of OH group of 1 (Scheme 3) for reaction with activated phosphorous reagent ($POCl_2NMe_2$), strong base is required to abstract the "H" of OH functional group as its pKa is close to 15. Thus—this is not a trivial chemistry where using strong base to deprotonate "H" and keeping intact of Fmoc is possible.

Scheme 1: synthesis of Fmoc protected Morpholino-OH (1)

B = T, C (N—Bz), A (N—Bz), G (N-Bu$^i$)

Scheme 2: Attempted Fmoc-protected chlorophosphoramidate active morpholino monomer synthesis Sinha, S. "Lithium bromide-DBU mediated synthesis of chlorophosphoramidate-activated morpholino nucleoside subunits" Tetrahedron Lett. 2012, 53, 6714-6717

Under varied conditions using bases like LiHMDS, LDA and ᵗBuOK, attempts were failed to furnish the Fmoc-protected activated monomers. Bases like N-ethylmorpholine or DABCO whose $pK_a$ is less than 8 was not sufficient to react for yielding the product. Perhaps, this is the reason Trityl protected monomers were used in PMO synthesis by gene tools LLC (www.gene-tools.com). Then it was envisioned that the reactivity of phosphorous reagent ($POCl_2NMe_2$), needed to be increased with a general acidic catalyst which could be useful for the reaction with a milder base.

It is not the extension of this published work because chemistry is different. In the published work (1046-1050 Nucleic Acids Research, 1998, Vol. 26, No. 4) they used phosphoramidites monomer where phosphorous is in trivalent state and is very much reactive where the mechanism of activation by 4,5-dicyanoimidazole is different than the present invention. Here used $POCl_2NMe_2$ reagent where phosphorous is in pentavalent state, less reactive centre. It was difficult to find a suitable reagent or combination of reagents to make the reaction feasible.

Example 3

Synthesis of Fmoc-Protected Chlorophosphoramidate Morpholino Monomers

A series of general acids like tetrazole, ETT, 1,2,4-triazole and DCI (dicyanoimidazole) were screened for the purpose. Finally, the reaction conditions was made selective to obtain desired Fmoc-protected activated chlorophosphoramidate monomers according to scheme 3.

Scheme 3: Synthesis of Fmoc-protected chlorophosphoramidate morpholino monomers

17

-continued

B = G (i-Bu), 40%

N-Ethylmorpholine (NEM) was added as a base whose pKa is ~8 under which Fmoc was stable. N-methylimidazole (NMI) was also required to complete the reaction with high yields. Several solvents like a mixture of acetonitrile & DCM, acetonitrile or DCM were screened and DCM was found to be the best solvent to obtain the highest yields and this enabled the use of the same for PMO synthesis. Unlike Tr-protected monomers, all these Fmoc protected monomers were stable in NMP (N-methyl-2-pyrrolidone) or acetonitrile (ACN) which are the common solvents used for DNA or peptide synthesis.

Stability of the Fmoc Intermediates Compared to the Other Derivatives Like Trityl or Monomethoxytrityl Derivative)

As Tr-monomers are poorly soluble in ACN (0.013 M) as compared to Fmoc monomers in ACN (0.1 M), hence the stability was checked in NMP.

Figure 1:
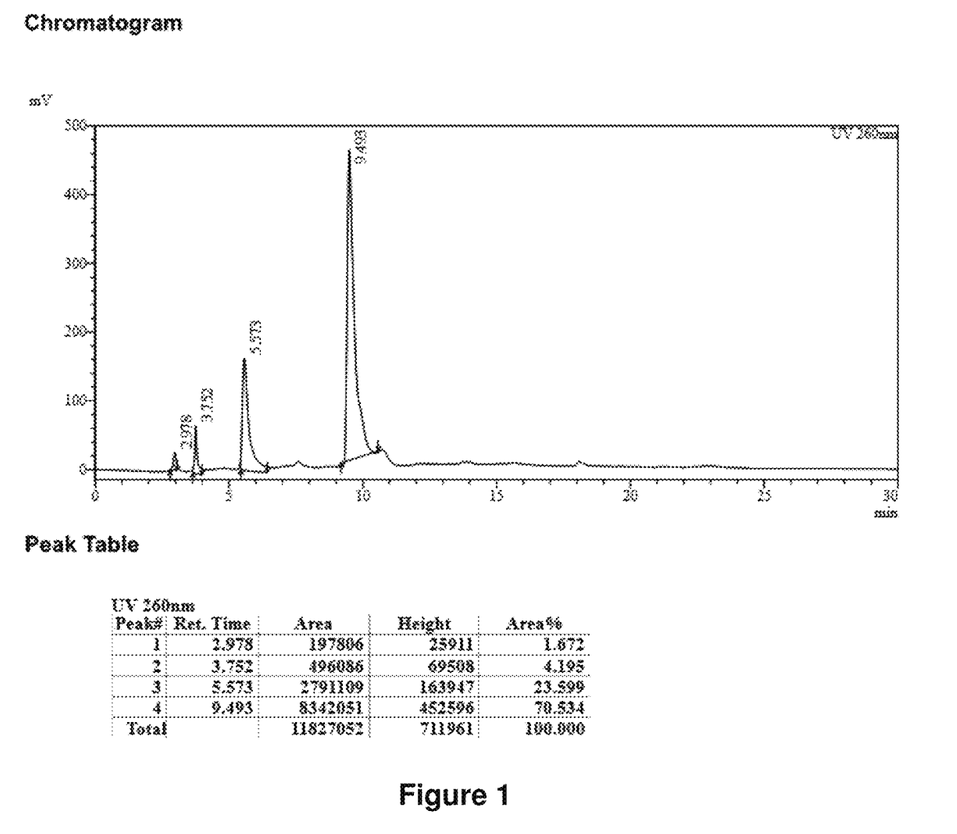
FIG. 1: Chromatogram of Sequence 5'-TTCCAACCGG-3'(synthesized using H-phosphonate chemistry); Reverse phase C18 column; 5-50% ACN in 0.1 M Ammonium acetate (pH=7.12).
Figure 2:
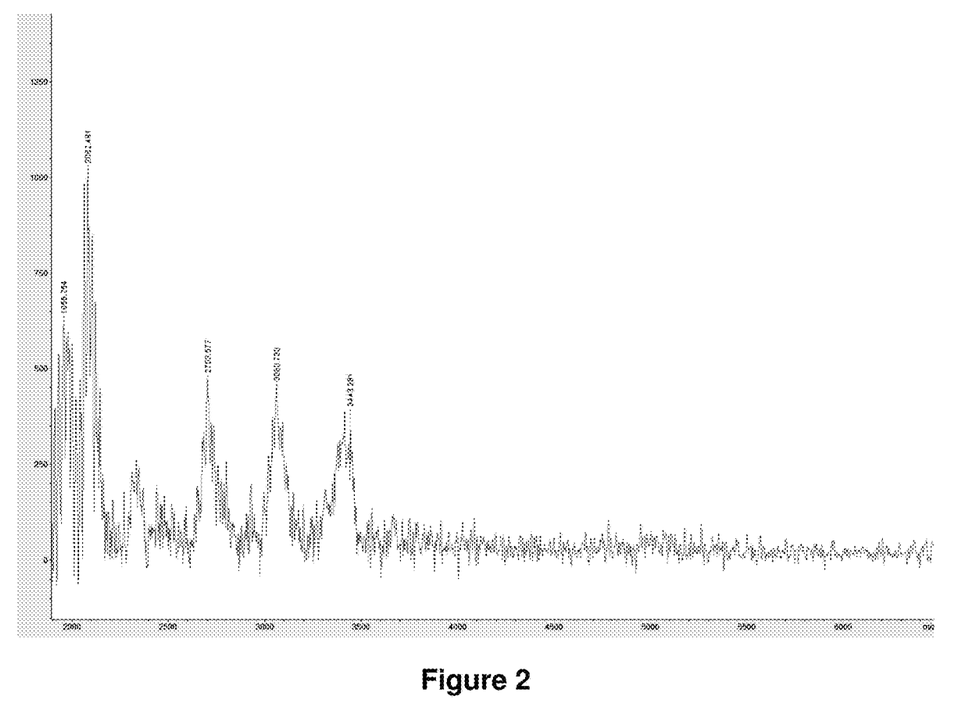
FIG. 2: MALDI-TOF Calculated for $C_{129}H_{189}N_{55}O_{41}P_9$ is 3443.2028 found 3443.281 Sequence 5'-TTCCAACCGG-3'(synthesized using H-phosphonate chemistry).
Figure 3:
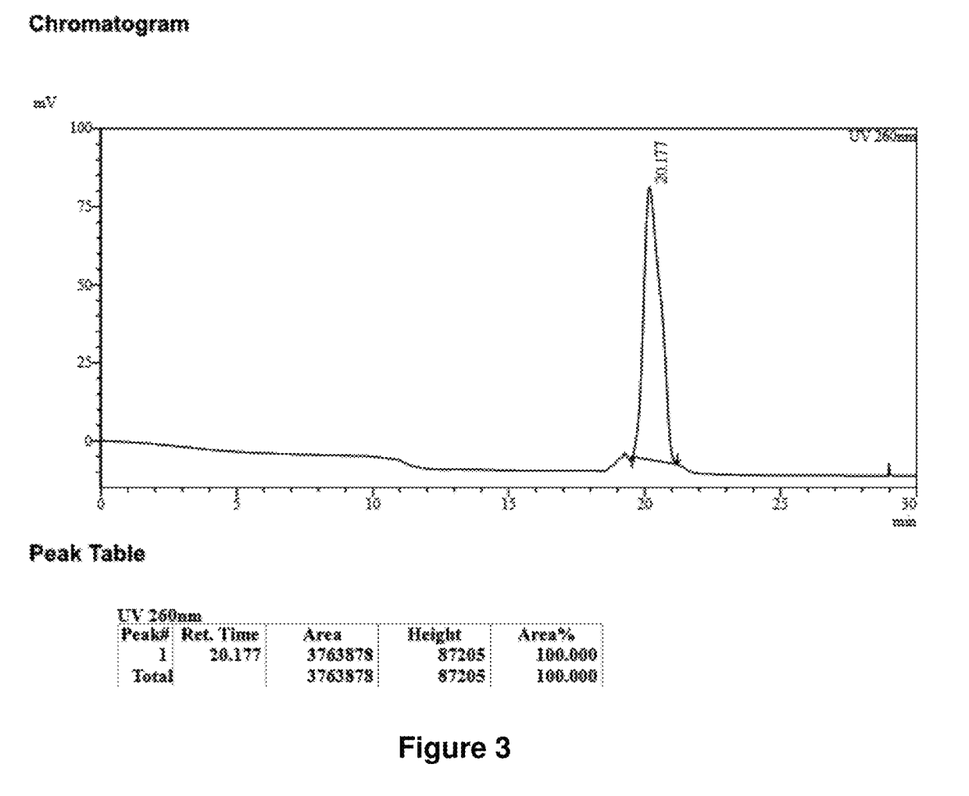
FIG. 3: Chromatogram of purified Sequence 5'-GACTTGAGGCAGACATATTTCCGAT-3'(synthesized using chlorophosphoramidate chemistry). Reverse phase C18 column; 5-50% ACN in 0.1 M Ammonium acetate (pH=7.12).
Figure 4:
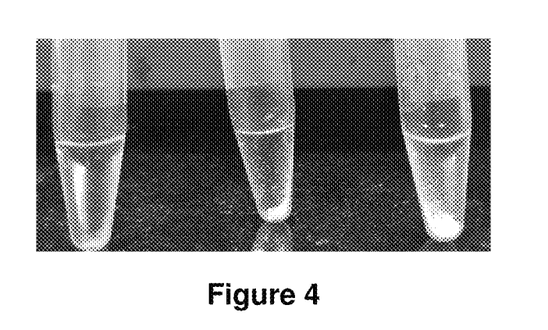
FIGS. 4 and 5 show the poor solubility of Trityl-protected T, C (N-Bz) and A (N-Bz) with a precipitation even as low as 0.013 M concentration whereas Fmoc-protected monomers are clearly soluble even at 0.1 M concentration in ACN.
Figure 5:
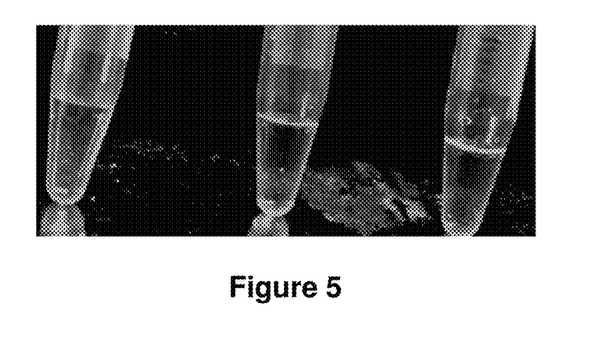

FIGS. 4 and 5 show the poor solubility of Trityl-protected T, C (N-Bz) and A (N-Bz) with a precipitation even as low as 0.013 M concentration whereas Fmoc-protected monomers are clearly soluble even at 0.1M concentration in ACN. The solubility is important in oligonucleotide synthesis, allowing for higher effective concentrations of activated monomers during the coupling step in solid phase oligonucleotide synthesis.

As the solubility of Tr-protected activated monomers are poor in ACN, hence, experiments were undertaken involving T, C and A-monomers for Tr and Fmoc protected to check the stability in NMP solvent in 0.1 M concentration up to 12 hrs. As per TLC observation, Fmoc protected monomers were stable but Tr-protected monomers were not stable much with some percentage of decomposition.

Screening with general acids like tetrazole, ETT, 1,2,4-triazole, DCI (dicyanoimidazole) and iodine provided Tetrazole-12-20%, DCI—5-10%, 1,2,4-triazole-5-10%, $I_2$—40-55%, ETT—40-60% yields respectively.

Procedure for Fmoc Protected Chlorophosphoramidate Active Monomer:

To a stirred solution of Fmoc protected morpholine-OH (1) in dry DCM, ETT (2 eq) and NEM (5 eq) were added at 0° C. and then $NMe_2POCl_2$ (2 eq) and NMI (2 eq) were added. The reaction mixture was allowed to stir for another 15 to 20 minutes at rt. Then the reaction mixture was concentrated in rotary evaporator and then re-dissolved in DCM and washed with water. The organic layer was dried over $Na_2SO_4$ and solvent was evaporated in rotary evaporator and the crude product was purified in column chromatography using silica gel and eluting with acetone-DCM to get the pure product (2a-2d) as a white solid.

18

2a:

$^1$H NMR (300 MHz, $CDCl_3$): δ1.95 (3H, s), 2.71-2.84 (8H, m), 3.71-4.01 (2H, m), 4.22-4.27 (4H, m), 4.46-4.51 (2H, m), 5.68 (1H, br s), 7.30-7.43 (5H, m), 7.53-7.58 (2H, m), 7.75-7.78 (2H, d, J=9 Hz), 8.81-8.83 (1H, d, J=6 Hz). HRMS (ESI) m/z (M+Na)$^+$ calculated for $C_{27}H_{30}ClN_4O_7PNa^+$=611.1433 found 611.1437.

2b:

$^1$H NMR (300 MHz, $CDCl_3$): δ1.93 (2H, br s), 2.72 (3H, d, J=1.5 Hz), 2.76-2.77 (3H, d, J=3 Hz), 3.80 (1H, t, J=6 Hz), 4.10 (1H, br s), 4.23-4.28 (3H, m), 4.46 (2H, br s), 4.60 (1H, br s), 5.84 (1H, br s), 7.32-7.42 (4H, m), 7.49-7.63 (6H, m), 7.75-7.78 (2H, d, J=9 Hz), 7.90-7.92 ((2H, d, J=6 Hz), 8.01-8.13 (1H, m), 8.88 (1H, br s). HRMS (ESI) m/z (M+H)$^+$ calculated for $C_{33}H_{33}ClN_5O_7P^+$=677.1806 found 677.1808.

2c:

$^1$H NMR (300 MHz, $CDCl_3$): δ2.67 (3H, s), 2.72 (3H, s), 2.82-2.98 (2H, m), 3.24-3.33 (1H, m), 3.84 (1H, t, J=6 Hz), 4.24 (4H, t, J=6 Hz), 4.47-4.65 (3H, m), 5.80 (1H, t, J=3 Hz), 7.31-7.73 (11H, m), 8.36-8.91 (2H, m), 7.76 (2H, br s), 7.88-7.91 (1H, d, J=6 Hz), 8.97-9.18 (1H, m), 12.18 ((1H, br s). HRMS (ESI) m/z (M Na)$^+$ calculated for $C_{34}H_{33}ClN_7O_6PNa^+$=724.1811 found 724.1809.

2d:

$^1$H NMR (300 MHz, $CDCl_3$): δ1.19-1.31 (6H, m), 2.71-2.76 (6H, m), 2.81-2.91 (4H, m), 3.84-3.86 (2H, m), 4.26 (4H, t, J=6 Hz), 4.51-4.56 (3H, m), 5.43-5.47 (1H, m), 7.30-7.43 (4H, m), 7.57 (2H, t, J=9 Hz), 7.76 (2H, br s), 7.88-7.91 (1H, d, J=6 Hz), 8.97-9.18 (1H, m), 12.18 ((1H, br s). HRMS (ESI) m/z (M+H)$^+$ calculated for $C_{31}H_{36}ClN_7O_7P^+$=684.2102 found 684.2104.

Example-4

Synthesis of Fmoc-Protected H-Phosphonate Monomers

Scheme 4: Synthesis of Fmoc-protected H-phosphonate monomers

Procedures:

1
Fmoc-protected
Morpholino monomer

PCl₃, NEM
DCM,
TEAB buffer (pH 8.5)
15 min, 0° C.

3
Fmoc-protected
H-phosphonate
Morpholino monomer

-continued

3a  B = T, 66%
3b  B = C (Bz), 63.6%
3c  B = A (Bz), 64.3%
3d  B = G (i-Bu), 39.5%

To a stirred solution of PCl$_3$ (5 mmol) and N-ethyl morpholine (10 mmol) in dry DCM was added 1,2,4-triazole (17 mmol) and stirred at room temperature for 30 min. DCM solution of hydroxy morpholino monomer (1) (A-Bz, T, G-iso-butyryl and C-Bz) (1.0 mmol, dried by co-evaporation from CH$_3$CN) was then added dropwise at 0° C. The reaction mixture was stirred at 0° C. for 10 min (until TLC showed complete consumption of starting material). The reaction mixture was quenched with corresponding buffer (Triethylammonium bicarbonate) solution to get triethylammonium salt and stirred for 5 min and then separated in a separating funnel. The aqueous layer was extracted with DCM. The combined organic part was dried over Na$_2$SO$_4$ and concentrated under reduced pressure. Crude product was purified by column chromatography in 100-200 mesh silica gel eluting with MeOH-DCM. Corresponding H-Phosphonate monomer was characterized by spectroscopy methods and HRMS.

3a:
HRMS (ESI) m/z (M+H)$^+$ calculated for $C_{31}H_{42}N_4O_8P^+$ =629.2735 found 629.2734.

3b:
HRMS (ESI) m/z (M+H)$^+$ calculated for $C_{37}H_{45}N_5O_8P^+$ =718.3000 found 718.3003.

3c:
HRMS (ESI) m/z (M+H)$^+$ calculated for $C_{38}H_{44}N_7O_7PNa^+$=764.2938 found 764.2936.

3d:
HRMS (ESI) m/z (M+H)$^+$ calculated for $C_{35}H_{47}N_7O_8P^+$ =724.3218 found 724.4554.

Advantages of Fmoc H-phosphonate monomer synthesis over Trityl H-phosphonate monomer synthesis as reported earlier by Sinha, S. et. al *Tetrahedron Lett.* 2015, 56, 4565-4568 and Sinha, S. et. al. (Patent Application No. as 201631037420, 2 Nov. 2016).

1. In case of Trityl or MMTr protected H-phosphonate monomer synthesis 5 equivalent PCl$_3$, 50 equivalent of NEM and 17 equivalents of 1,2,4-triazole is used. Excess of NEM is used to prevent the trityl or MMTr deprotection in presence of HCl, generated from the hydrolysis of PCl$_3$.
2. While purifying the material in silica gel column chromatography addition of 2% of triethyl amine along with 10% MeOH-DCM need to be continued till end of the column as trityl and MMtr is acid sensitive.
3. Due to addition of excess triethyl amine during column chromatography it becomes difficult to remove the triethyl amine and the material is gummy.
4. It takes lot of time to remove the excess triethyl amine by co-evaporation with Dry acetonitrile or dry DCM.
5. In case of Fmoc protected H-phosphonate monomer NEM is used 10 equivalents as Fmoc group is pretty stable in PCl$_3$. In the purification MeOH-DCM is sufficient enough to elute the material without adding any triethyl amine.

Example-5

Synthesis of Morpholino Oligomers on Solid Support Using ETT as an Activating Reagent Instead of LiBr Solid supported monomer was synthesized on amino polystyrene resins as per the earlier reported Patent Application No. as 201631037420, 2 Nov. 2016 by the present inventors.

Earlier LiBr was used in the coupling step in chlorophosphoramidate chemistry as reported by Sinha et. al. *Current Protocols in Nucl. Acid Chem.* 2015, 4.65.1-4.65.26 (Wiley) but here ETT was used as an activator because of its superior performance than LiBr.

Procedure:

Route A (Chlorophosphoramidate Chemistry):

First the Fmoc group of the loading monomer from solid support was deprotected using (a) 20% piperidine-DMF to generate the free amine which was allowed to react with (b) Fmoc protected chlorophosphoramidate morpholino monomer in presence of ETT and NEM in NMP to obtain dimer. All these were added three times in portion-wise in 20 minutes interval. Excess reagents were washed out and then unreacted amine which did not undergo coupling was capped with (c) (1:1) 10% $Ac_2O$-NMP and 10% DIPEA (diisopropylethylamine)-NMP. Then capping reagents were washed out and deblocking was performed prior to next coupling. Again deblocking (a), coupling (b) and capping (c) cycle was repeated until desired oligomer 25-mer 5'-GACTTGAGGCAGACATATTTCCGAT-3' was obtained which was finally cleaved from solid support with (d) 30% aqueous ammonia at 55° C. for 16 h. Purity of the synthesized oligos was checked by HPLC and characterized by MALDI.

Route B (H-Phosphonate Chemistry):

First the Fmoc group of the loading monomer is deprotected using (a) 20% piperidine-DMF and then the free amine was allowed to react with (e) Fmoc protected H-phosphonate morpholino monomer in presence of pivaloyl chloride or 1-adamantanecarbonyl chloride and p-nitrophenol or 2,4,6-trichloropehnol or phenol in a mixture of 1:1 Pyridine-ACN to obtain dimer. All these were added three times in portion-wise in 10 minutes interval. Excess reagents were washed out and then unreacted amine was capped with (f) (1:1) 10% $Ac_2O$-ACN and 10% Py-ACN. Then capping reagents were washed out and Fmoc-deblocking was performed prior to the next coupling. The synthetic cycle was repeated until desired oligomer was obtained which was finally oxidized with (g) 2M $Me_2NH$ and 0.1 M 12 solution in THF to introduce $NMe_2$ group to phosphorous in the backbone. Then the oligo was cleaved from solid support with (d) 30 aqueous ammonia at 55° C. for 16 h. Using H-Phosphonate chemistry 10-mer 5'-TTCCAACCGG-3' was synthesized. Purity of the synthesized oligos was checked by HPLC and characterized by MALDI.

Advantage of Using ETT Over LiBr in Solid Phase Morpholino Synthesis

1. In case of ETT it reaches to 100% coupling at the $3^{rd}$ coupling (20 min each coupling cycle) while in case of LiBr it reaches to 100% coupling at $5^{th}$ coupling. Hence, total five times couplings were required, and wastage of monomers were significantly higher. For the synthesis of longer PMO (say 25-mer), it is an impractical method.
2. In solution phase the dimer formation using ETT (2 eq) and active chlorophosphoramidate monomer (1 eq) and NEM (5 eq) the reaction was completed in less than 2 hours, but in case of LiBr even after 2 hours the reaction was not completed, about 40% starting material was intact.

Figure 6:
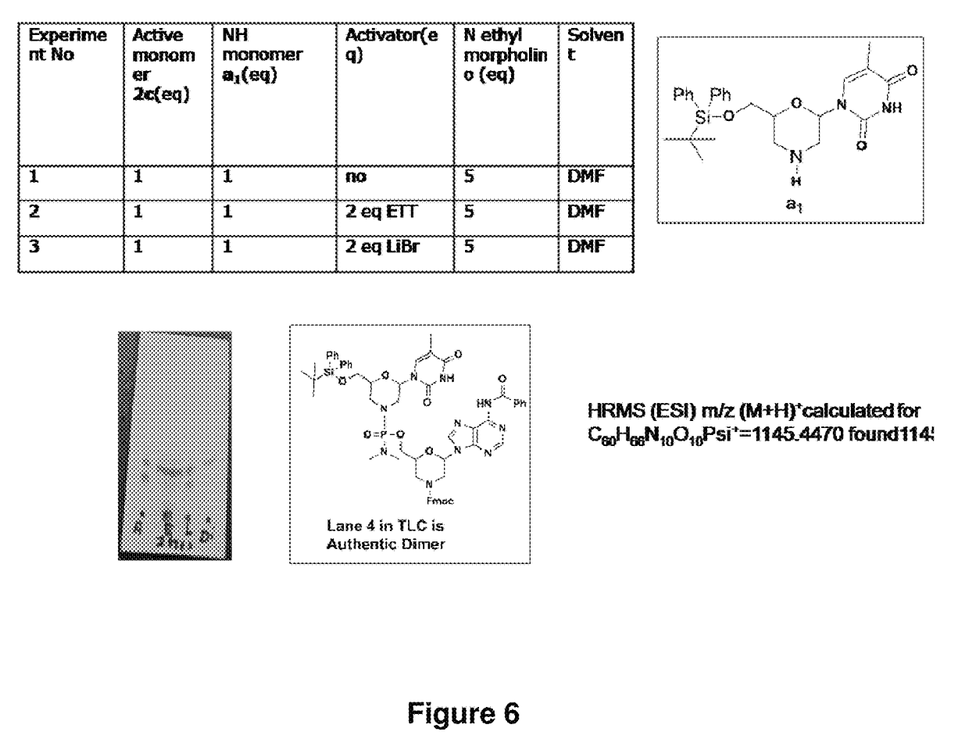
FIG. 6: Lane 1. No additive (~40% reaction to obtain dimer); Lane 2. In presence of ETT, complete conversion to dimer; Lane 3. In presence of LiBr (~60% conversion to the product); Lane 4. authentic dimer sample.
Figure 7:
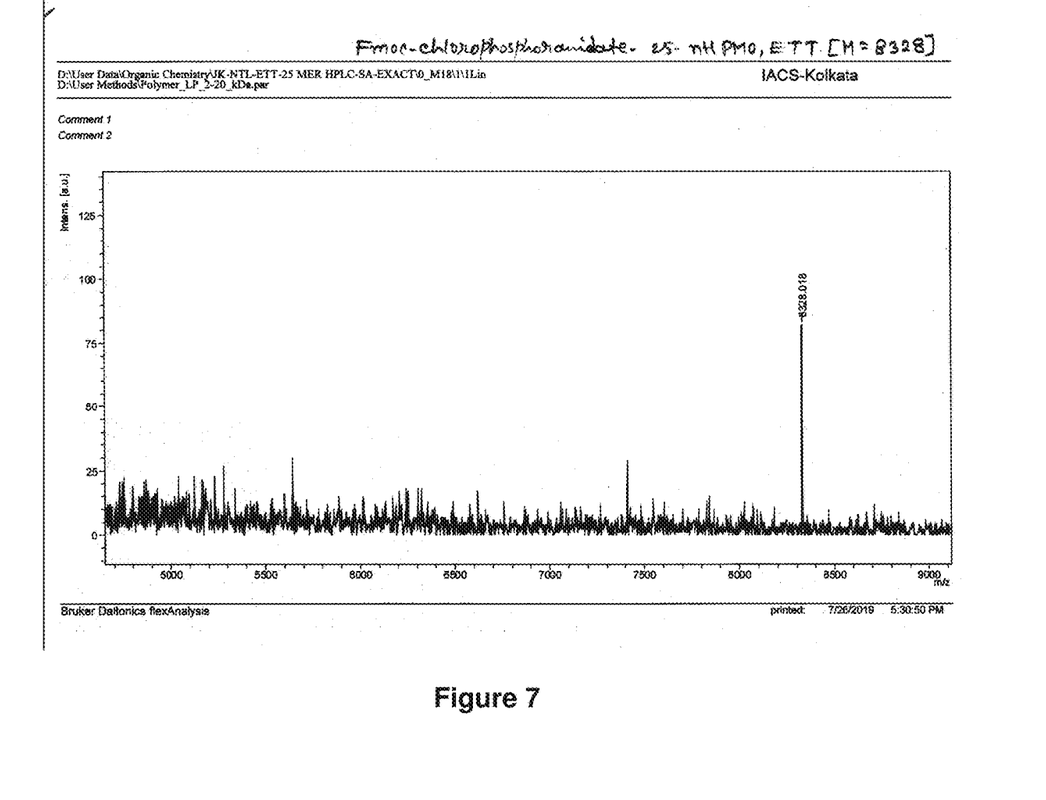
FIG. 7: MALDI-TOF Calculated for $C_{293}H_{479}N_{143}O_{99}P_{24}$ is 8328.0546 found 8328.018 Sequence 5'-GACTTGAGGCAGACATATTTCCGAT-3' (synthesized using chlorophosphoramidate chemistry).

FIG. 6: Lane 1. No additive (~40% reaction to obtain dimer); Lane 2. In presence of ETT, complete conversion to dimer; Lane 3. In presence of LiBr (~60% conversion to the product); Lane 4. authentic dimer sample.

Similar coupling efficiency was also observed in presence of iodine. Hence both ETT and iodine are activators worked equally well in coupling step.

It is thus possible for the present advancement to provide for (i) Fmoc-protected activated morpholino monomers highly stable in common organic solvents such as DMF, NMP, acetonitrile, THF and DCM etc which are normally used for oligomer synthesis, (ii) Piperidine-mediated deblocking of Fmoc group for coupling during oligomer synthesis,

(iii) Increase of monomers concentration up to 0.15 M (Typically used 0.05 to 0.15 M for oligomer synthesis) whereas Tr or MMTr-protected monomers can go upto <0.05M concentration, (iv) Improved coupling efficiency in presence of ETT [(5-(ethylthio)-1H-tetrazole)] in comparison to LiBr.

(v) PMO oligomers synthesis by peptide or DNA synthesizer using Fmoc-protected monomers.

The invention claimed is:

1. Morpholino monomers comprising Fmoc (Fluorenylmethoxycarbonyl)-protected chlorophosphoramidate monomers and H-phosphonate monomers as per the general formula 2 and 3 represented by the following 2. Morpholino monomers as claimed in claim 1 that are capable of activation for further coupling and chain elongation leading to Morpholino based oligonucleotides (PMO).

3. Morpholino monomers as claimed in claim 1 that are stable in solution preferably in common organic solvents including DMF, NMP, acetonitrile, THF and DCM normally used for oligomer synthesis, involves allows easy deprotection of Fmoc group, and is capable of further chain elongation favouring oligonucleotides preferably via DNA or peptide synthesizer and/or solid phase synthesis.

4. Morpholino monomers as claimed in claim 1 wherein said general formula 2 includes monomers (2a)-(2d) depending on nucleotide base substitutions in the morpholino ring as per the following monomers:

wherein for said a, b, c, d monomers; base B=Thymine, Cytosine (Bz), Adenine (Bz), Guanine (i-Bu).

5. Morpholino monomers as claimed in claim 1 wherein said general formula 3 includes monomers (3a)-(3d) depending on nucleotide base substitutions in the morpholino ring as per the following monomers:

wherein for said a, b, c, d monomers; base B=Thymine, Cytosine (Bz), Adenine (Bz), Guanine (i-Bu).

6. Morpholino monomers as claimed claim 1 adapted for morpholino oligomers comprising Fmoc (Fluorenylmethoxycarbonyl)-protected chlorophosphoramidate monomers and/or H-phosphonate monomers.

7. A process for the synthesis of morpholino monomers as claimed in claim 1 of general formula (2) comprising the steps of activating by ETT [5-(Ethylthio)-1H-tetrazole)] to activate the phosphorous reagent ($POCl_2NMe_2$) in presence of milder base of pKa ~8 to facilitate the reaction with Fmoc protected morpholine —$CH_2OH$.

8. A process for the synthesis of morpholino monomers as claimed in claim 7 of general formula (2) following the steps of
 (i) Providing Fmoc protected morpholine-OH taken in dry DCM to which ETT (2 eq) and N-Ethylmorpholine (NEM) (5 eq) were added at 0° C.; and
 (ii) adding $NMe_2POCl_2$ (2 eq) and N-methylimidazole (NMI) (2 eq) followed by stirring in room temperature for about 15 to 20 minutes to obtain product Fmoc protected chlorophosphoramidate morpholino monomers as a white solid.

9. A process for the synthesis of morpholino monomers as claimed in claim 5 of general formula (3) comprising the steps
 (i) Providing a stirred solution of $PCl_3$ (5 mmol) and N-ethyl morpholine (10 mmol) in dry DCM followed by addition of 1,2,4-triazole (17 mmol) and stirring at room temperature for 30 min.;

(ii) Adding DCM solution of Fmoc protected morpholine —$CH_2OH$ (1.0 mmol, dried by co-evaporation from $CH_3CN$) dropwise at 0° C. and stirring until complete consumption of starting material; and (iii) Quenching m corresponding buffer (Triethylammonium bicarbonate) solution to obtain triethylammonium salt and stirring for 5 min followed by extracting the aqueous layer in DCM and obtaining corresponding Fmoc protected H-Phosphonate morpholino monomer.

10. A process for the synthesis of morpholino monomers as claimed in claim 7 providing morpholino oligomers following the steps of:
   (i) Loading Fmoc protected morpholino monomer onto solid support amino polystyrene resins;
   (ii) Deprotecting the Fmoc group of thus loaded monomer involving (a) 20% piperidine-DMF to generate free amine on said solid support;
   (iii) reacting/coupling said free amine of said step (ii) involving (b) Fmoc protected chlorophosphoramidate morpholino monomer in presence of said ETT [5-(Ethylthio)-1H-tetrazole)], NEM [N-Ethylmorpholine] in NMP [N-methyl-2-pyrrolidone] to obtain dimer, added 3 times portionwise in 20 minutes interval followed by washing away excess reagents;
   (iv) capping unreacted amine of solid support from step (iii) not undergoing coupling, by involving (c) (1:1) 10% $Ac_2O$-NMP and 10% DIPEA (diisopropylethylamine)-NMP, followed by washing away of capping reagents followed by deblocking/deprotecting as per step (i) prior to next coupling;
   (v) Repeating deblocking (ii), coupling (iii) and capping (iv) cycle until desired 25-mer oligomer of 5'-GACTTGAGGCAGACATATTTCCGAT-3'; and
   (vi) Cleaving said oligomer from solid support and deprotection of nucleobase protecting groups involving (d) 30% aqueous ammonia at 55° C. for 16 h and obtaining oligomers therefrom.

11. A process for the synthesis of morpholino monomers as claimed in claim 9 providing morpholino oligomers following steps of:
   (i) Loading Fmoc protected morpholino monomer onto amino polystyrene resin solid support;
   (ii) Deprotecting the Fmoc group of thus loaded monomer by (a) 20% piperidine-DMF to generate free amine on said solid support;
   (iii) Reacting/coupling said free amine of said step (ii) by employing (b) Fmoc protected H-phosphonate morpholino monomer in presence of pivaloyl chloride and p-nitrophenol in a mixture of 1:1 Pyridine-ACN to obtain dimer, added 3 times portionwise in 10 minutes interval followed by washing away excess reagents;
   (iv) Capping unreacted amine of solid support from step (iii) not undergoing coupling, by employing (c) (1:1) 10% $Ac_2O$-ACN and 10% Py-ACN followed by washing away of capping reagents followed by deblocking/deprotecting as per step (i) prior to next coupling;
   (v) Repeating deblocking (ii), coupling (iii) and capping cycle until desired oligomer 10-mer 5'-TTCCAACCGG-3' is reached;
   (vi) Oxidizing said oligomer involving (d) 2M $Me_2NH$ and 0.1 M $I_2$ solution in THF to introduce $NMe_2$ group to phosphorous in the oligomer backbone; and
   (vii) Cleaving said oligomer from solid support by employing (e) 30% aqueous ammonia at 55° C. for 16 h and obtaining said oligomers therefrom.

12. A process for the synthesis of morpholino monomers as claimed in claim 7 and oligomers thereof wherein monomer concentration 0.05 to 0.15 M is employed for oligomer synthesis, as compared to Tr or MMTr-protected monomers employed only at <0.05M concentration, and wherein coupling efficiency in presence of ETT (5-(ethylthio)-1H-tetrazole) is improved as compared to LiBr, and wherein Fmoc-protected monomers PMO oligomers could be synthesized via DNA or peptide synthesizer.

13. A process for the synthesis of morpholino monomers as claimed in claim 10 and oligomers thereof wherein the coupling and deblocking conditions keep the oligomer intact without decomposition generating high yields in the range of 50% to 67%.

* * * * *